United States Patent [19]
Deinhart et al.

[11] Patent Number: 5,911,143
[45] Date of Patent: *Jun. 8, 1999

[54] METHOD AND SYSTEM FOR ADVANCED ROLE-BASED ACCESS CONTROL IN DISTRIBUTED AND CENTRALIZED COMPUTER SYSTEMS

[75] Inventors: Klaus Deinhart, Renningen, Germany; Virgil Gligor, Chevy Chase, Md.; Christoph Lingenfelder, Walldorf; Sven Lorenz, Stuttgart, both of Germany

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/514,710

[22] Filed: Aug. 14, 1995

[30] Foreign Application Priority Data

Aug. 15, 1994 [DE] Germany ............................ 94 112 649

[51] Int. Cl.$^6$ ..................................................... G06F 17/30
[52] U.S. Cl. ............................ 707/103; 707/104; 707/10; 707/9; 395/728; 395/800
[58] Field of Search ...................................... 395/614, 650, 395/728, 800, 700; 707/103, 104, 9, 10

[56] References Cited

U.S. PATENT DOCUMENTS

| 4,941,175 | 7/1990 | Enescu et al. | 380/23 |
|---|---|---|---|
| 5,113,442 | 5/1992 | Moir | 380/25 |
| 5,191,522 | 3/1993 | Bosco et al. | 364/401 |
| 5,315,657 | 5/1994 | Adabi et al. | 380/25 |
| 5,321,841 | 6/1994 | East et al. | 395/725 |
| 5,414,844 | 5/1995 | Wang | 395/650 |
| 5,414,852 | 5/1995 | Kramer et al. | 395/700 |
| 5,446,903 | 8/1995 | Abraham et al. | 395/725 |
| 5,450,593 | 9/1995 | Howell et al. | 395/650 |
| 5,469,556 | 11/1995 | Clifton | 395/490 |
| 5,475,839 | 12/1995 | Watson et al. | 395/650 |
| 5,539,906 | 7/1996 | Abraham et al. | 395/600 |
| 5,564,016 | 10/1996 | Korenshtien | 395/186 |

OTHER PUBLICATIONS

Hartig et al., "Mechanisms for persistence and security in birlix", IEEE/INSPEC, pp. 309–318. May, 1990.

Born et al., "Discretionary access control by means of usage conditions", IEEE/INSPEC, pp. 437–450, vol.: 13, No. 5, Jan. 1994.

Hu et al., "User–role based security profiles for an object–oriented design model", IEEE/INSPEC, pp. 333–348, vol. A–21, Aug. 1992.

Hu et al., "User–role based security profiles for an object–oriented design model", Compendex Plus, issue: N. A–21, pp. 333–348, Aug. 1993.

(List continued on next page.)

Primary Examiner—Paul V. Kulik
Assistant Examiner—Jean M. Corrielus
Attorney, Agent, or Firm—Edward H. Duffield

[57] ABSTRACT

A method and system for registration, authorization, and control of access rights in a computer system. Access rights of subjects on objects in a computer system are controlled using parameterized role types that can be instantiated into role instances equivalent to roles or groups. The required parameters are provided by the subject of the computer system, e.g. by a person, a job position, or an organization unit. Furthermore, relative resource sets are instantiated into concrete resource sets and individual resources by using the same parameter values as for instantiating the role types. Authorization and control of access rights include capability lists providing the access rights of the subjects on the objects of a computer system on a per subject basis. Furthermore, access control lists are derived from capability lists, so that access rights of the subjects on the respective objects are provided.

11 Claims, 10 Drawing Sheets

OTHER PUBLICATIONS

Demurjian et al. "Towards an authorization mechanism for user–role based serity in an object–oriented design model", IEEE, pp. 195–202, Jul. 1993.

Biskup et al. "The personal model of data: Towards a privacy–oriented information system", IEEE, pp. 575–597, Dec. 1988.

Ting et al., "Requirements, capabilities and functionalities of user–role based security for an object–oriented design model", IEEE, pp. 275–296, Nov. 1991.

Jonscher. D, "Extending access control with duties–realized by active mechanisms", IEEE/INSPEC, pp. 91–111, vol.: A–21, Aug. 1992.

Kelter. U, "Type–level access control for distributed structurally object–oriented database systems", IEEE/INSPEC, pp. 2–40, Nov. 1992.

Jonscher et al., "A role–based modelling of access control with the held of frames", IEEE/INSPEC, pp. 147–158, May 1991.

| Org. Unit 7 | Job Position 6 | 2nd-Line Manager | 1st-Line Manager | Team Leader (Role Type) | Loan Specialist | Customer Consultant | Typist | Object Appraiser | Archival Specialist | Secretary(Role Type) | Bank Employee |
|---|---|---|---|---|---|---|---|---|---|---|---|
| Real Estate Loans | Division Manager | x | | | | | | | | | x |
| | Secretary | | | | | | | | | x | x |
| | Advisor | | | x | | | | x | | | x |
| Private Loans | Dept. Manager | | x | | | | | | | | x |
| | Team Leader | | | x | x | | | | | | x |
| | Staff Member 1 | | | | | x | | | | | x |
| | Staff Member 2 | | | | x | x | | | | | x |
| | Staff Member 3 | | | | x | | | | | | x |
| | Advisor | | | x | | | | x | | | x |
| Object Appraisal | Dept. Manager | | x | | | | | | | | x |
| | Team Leader | | | x | x | | | | | | x |
| | Staff Member 1 | | | | x | | | | | | x |
| | Staff Member 2 | | | | | | x | | | | x |
| | Staff Member 3 | | | | | | | | x | | x |
| Corporate Loans | Dept. Manager | | x | | | | | | | | x |
| | Secretary | | | | | | | | | x | x |

Fig. 2B

METHOD AND SYSTEM FOR ADVANCED ROLE-BASED ACCESS CONTROL IN DISTRIBUTED AND CENTRALIZED COMPUTER SYSTEMS

FIELD OF THE INVENTION

The present invention relates to the technical field of role-based access control methods and security systems in distributed and centralized computer systems. More specifically, the invention relates to a method for controlling access rights of subjects on objects in a computer system by controlling said access rights dependent on a membership of a subject to a role. Furthermore, the invention relates to a system for registration, authorization, and control of access rights of subjects on objects in a computer system, wherein the system comprises users, groups, and access control lists at each object providing the access rights on the respective object.

DESCRIPTION OF THE PRIOR ART

In a computer system the accesses of users to data have to be controlled for security needs of the enterprise or organization using this computer system. The control of these accesses is performed by using access rights defining whether and how a user may access data in the computer system. This access control is performed by a security system which is integrated in or added to the operating system of the computer system. This security system performs a specific method for controlling access rights.

In most of the installed computer systems access rights are granted or revoked explicitly for individual users or group of users on respective data or, more generally, on respective objects by a system administrator. All access rights of all users on an object form an access control list (ACL) associated to the object. When an access request occurs during operation time of the computer system from a user or, more generally, from a subject to the object, then the security system looks at the access control list of the respective object and decides whether the subject may access the object in the requested manner. These broadly installed security systems allow a so-called "per-object-review" of access rights, that is, to determine the kind of access rights of all subjects of a computer system to a respective object.

Since it is very inconvenient for a system administrator to provide each user with individual access rights, and to achieve a higher grade of data security and integrity in a computer system, a Role-Based Access Control (RBAC) method has been developed. Therein, a role is mainly a definition of a job at the lowest level of granularity used in the enterprise or organization. In a role-based access control system the system administrator only has to grant or revoke access rights to a role and has to group different subjects under each role.

In F. H. Lochovsky: "Role-Based Security in Data Base Management Systems" which is incorporated in C. E. Landwehr (editor): "Database Security: Status and Prospects", Elsevier Science Publishers B. V., 1988, pp. 209–222, the use of roles and objects in specifying a security mechanism for data base management systems is discussed. Using the idea that a user can play certain roles, authorization is specified using these roles.

In R. W. Baldwin: "Naming and Grouping Privileges to Simplify Security Management in Large Data Bases", Proceedings of IEEE Symposium on Security and Privacy, Oakland, 1990, pp. 116–132, authorization and control of access rights in large security systems in the field of data base objects are described.

In D. Ferraiolo et al: "Role-Based Access Controls", Proceedings of the 5th National Computer Security Conference, October 1992, pp. 554–563, the role-based access control method is described in detail. Access control decisions are often based on the roles individual users take on as part of an organization. A role specifies a set of transactions that a user or set of users can perform within the context of an organization. Role-based access control provides a means of naming and describing relationships between individuals and access rights, providing a method of meeting the secure processing needs of many commercial and civilian government organizations.

Concerning the method of controlling access rights in a computer system as known from the existing role-based access control methods it is disadvantageous that a large number of similar but not identical job positions in an organization requires a large number of roles. This large number of roles causes a high storage requirement for the security system within the computer system. Furthermore, it is disadvantageous that the large number of roles causes high computing requirements for the security system. Both aspects lead to high costs for the operation of the security system. Furthermore, it is disadvantageous that the large number of roles makes it very difficult to manage the security system. The system administrator has to create a new role when a person remains in his job position but changes his location or project. This will cause higher costs or even less system security. Furthermore, since a role includes the union of all accesses and objects which users of that role have in different organization units of the enterprise. This means that the role will not necessarily contain the least privileges necessary for the functions of that role, i.e., a violation of the "Least Privilege Principle". However, if one attempts to mitigate the lack of access granularity with defining different roles based on access and object contexts, which may be possible in some designs, an administrative mechanism becomes necessary to relate these roles so that their consistent administration, e.g., update, becomes possible. Such a mechanisms is not available today.

Concerning the access control system, it is disadvantageous that the existing role-based access control systems do not use the existing security mechanisms of the installed computer systems based on the existence of access control lists. Therefore, new security mechanisms or even a new security systems have to be implemented on the existing computer system. This causes additional hardware and software development with related high costs. This is even more disadvantageous in distributed or large centralized computer systems. Existing standard access control mechanisms for distributed systems as described in "Introduction to OSF DCE", Open Software Foundation (OSF), 1991, allow scalability to very large distributed systems. To date no role-based access control method scalable to large distributed systems exists.

It is an object of the present invention to provide a method for controlling access rights that is scalable to very large distributed computer systems and requires less storage and computing performance for the security system. Furthermore, it is an object of the invention to provide a role-based method for controlling access rights that does not necessarily violate the "Least Privilege Principle" but at the same time is more flexible and more convenient for the system administration.

Concerning the system for authorization and control of access rights, it is an object of the invention to provide a system that can use the security system of installed computer systems based on access control lists.

SUMMARY OF THE INVENTION

A method and system for registration, authorization, and control of access rights in a computer system are disclosed in the present invention. The inventive method for controlling access rights of subjects on objects in a computer system uses parameterized role types that can be instantiated into role instances equivalent to roles as known from the prior art. The required parameters are provided by the subject of the computer system. The computer system may derive the parameters from the job position of a subject or its membership in an organization unit. Furthermore, the inventive method provides relative resource sets which are instantiated into concrete resource sets and individual resources by using the same parameter values as for instantiating of role types.

The inventive system for authorization and control of access rights as disclosed in the present invention comprises capability lists providing the access rights of the subjects on the objects of a computer system on a per-subject basis. Furthermore, the inventive system comprises means for deriving access control lists from the capability lists, wherein the system provides said access rights of the subjects on the respective objects on a per-object basis. Within the inventive method, subjects are all possible types of holders of access rights within said computer system as for example persons, job positions, role instances, users, and transactions. Furthermore, objects are all possible types of resources on which access rights can be defined within the computer system as for example files, disks, displays, printers, scanners, and transactions.

The invention eliminates the disadvantages previously described for the prior art. A method for controlling access rights providing role types that can be instantiated into role instances offers the possibility to design a security system for a computer system with very high flexibility. Since only a small number of role types has to be defined it is advantageous that less computing resources have to be provided for the security system within the computer system. Furthermore, it is advantageous that less administration activities caused by the definition of only a small number of role types requires less efforts, and thus restricts the possibility and probability of errors and confusion and therefore provides a higher system security. Furthermore, it is advantageous that by providing the appropriate parameter values, the role instances of a role type can be restricted in such a way that the "Least Privilege Principle" is satisfied. Furthermore, it is advantageous that the automated generation of role instances by instantiating role types offers higher security of the computer system and higher integrity of the data within the computer system.

A role type combines a set of functional tasks with a common generic set of competencies. A role type can be viewed as a template for defining the types of access rights, objects, and transactions necessary to carry out a set of functional tasks.

A role instance, on the other hand, defines the set of concrete and specific competencies bound to a role type in a specific organization unit of the enterprise. An organization unit may be division, a department, a program, a project, a work-flow process or a combination thereof.

In one embodiment of the invention the role type is parameterized and the role instance is generated by using at least one parameter value. The use of a parameterized role type allows more flexibility of the security system and less administration activities. Furthermore, it is advantageous that the use of parameterized role types requires less computing resources for the security system.

In a further embodiment of the invention the objects of the computer systems form groups of concrete resource sets. Forming of such concrete resource sets is advantageous since it allows one to address functional groups of resources or objects with less computing efforts of the security system and less administrative overhead.

In a further embodiment of the invention the method allows the automated derivation of the concrete resource sets from parameterized relative resource sets. This offers a higher flexibility of the security system with less administration efforts. Furthermore, it is advantageous that less computing resources are required for the security system.

In a further embodiment of the invention the method provides the parameter value for instantiating the parameterized role types or the parameterized relative resource sets by the subjects of the computer system. This is advantageous since the derivation of role instances from role types or the derivation of concrete resource sets from relative resource sets can be fully automated and requires no administration efforts. This restricts the possibility and probability of errors and confusion and therefore provides a higher system security.

In a further embodiment of the invention the parameter value is provided by the job position or by the organization unit. This is advantageous since it provides a very flexible security system that requires very little administration activity when a person as a user of the computer systems changes job position or even organization unit. This requires less efforts, and thus restricts the possibility and probability of errors and confusion and therefore provides a higher system security.

In a further embodiment of the invention the job position is combined with at least one role type. This is advantageous since it allows the deriving of role instances associated with this role type by providing all necessary parameters for instantiating a role type with this job position. This allows automated derivation of role instances with no administration activity and therefore requires less efforts, and thus restricts the possibility and probability of errors and confusion and therefore provides a higher system security.

In a further step of the invention 8 the parameterized relative resource sets are associated with the role types. This is advantageous since it allows automated derivation of the concrete resource sets and objects by the same parameters as provided for the role types. This allows automated derivation of the concrete resource sets with no administration activities and therefore requires less efforts, and thus restricts the possibility and probability of errors and confusion and therefore provides a higher system security.

In a further step of the invention the inventive method performs a configuring step for deriving the role instances and the concrete resource sets and objects. This automated configuring step is performed with each administration action and provides at any time the actual and valid role instances and concrete resource sets and objects. This is advantageous since it guarantees the efficiency of the security system and guarantees the security and integrity of data within the computer system.

In a further embodiment the method specifies capability list types associated with the role types and performs an automated configuring step for deriving capability lists associated with role instances. The capability lists are instantiated from the capability list types by using the same parameters as for instantiating role types and these capability lists provide the access rights of the role instances on the objects within the computer system. The provision of capability lists within the security system of the computer system is advantageous, since it allows an automatic examination of the access rights of all subjects on all possibly objects within the computer system without any administration activities and therefore requires less efforts, and thus restricts the possibility and probability of errors and confusion and therefore provides a higher system security.

In a further embodiment of the invention the method generates or modifies access control lists associated with the concrete resource sets and objects. This is advantageous since it supports the security systems as known from the prior art and as used within a large number of installed computer systems with all information required from these security systems. Therefore, the inventive method can be easily applied to the existing security systems without difficult modification or even expensive new implementation of the security system. In the case of scalable existing security systems for large distributed environments this method guarantees scalability of the role-based access control mechanism as well.

In a further aspect of the invention the role types are organized hierarchically. This is advantageous since it allows the organization of role types by subsuming relations. Therefore, if a first role type subsumes a second role type then the set of access rights available to an instance of the first role type includes those available to a corresponding instance of the second role type. This allows very easy control of access rights with only little administration efforts. Furthermore, it is advantageous that the hierarchal organization of role types requires less computing resources of the security system.

With the invention related to a computer system for authorization and control of access rights, the disadvantages previously described for the prior art are eliminated. The registration, authorization, and control system presented in this application offers the advantage that access control lists at the object as well as capability lists at the subjects are provided. This allows a fast review of the access rights of a subject on all possible objects with only little computing resources for the security system. Furthermore, it allows a quick review of all access rights of all possible subjects on a specific object with only little computing resources for the security system. Furthermore, it is advantageous that a system comprising access control lists at the object as well as capability lists at the subject may be applied to all computer systems installed in the field without any change or new implementation in the operating system of the installed computer systems. Furthermore, the simultaneous existence of access control lists and capability lists offers high data security and integrity within the computer system. This is even more advantageous for large distributed computer systems.

In a further embodiment of the invention as the system comprises means for deriving the access control lists for the objects from the capability list at the subjects. The existence of this means is advantageous since it allows the automatic derivation of access control lists which are required from a large number of security systems of installed computer systems. Therefore, the inventive system can be easily applied to existing computer systems without any modification of the security system of the installed computer systems. Furthermore, it is advantageous that this means derives the access control lists automatically and therefore a high data security and integrity within the computer system can be guaranteed. Furthermore, since the underlying access control mechanisms of existing security systems are used for access control checks at operation time, the inventive system does not lead to performance penalties and is scalable to the same degree as the underlying system.

In a further embodiment of the invention the system comprises means for deriving the access control lists during a configuration step of the security system. This configuring step can be performed with or after each administration action. This means offers the advantage that the access control lists are actualized with each administration action and therefore guarantees high data security and integrity within the computer system. Furthermore, this means is advantageous since it guarantees the data security and integrity with less computing resources for the security system and requires less efforts, and thus restricts the possibility and probability of errors and confusion and therefore provides a higher system security.

In a further embodiment the system comprises means for deriving the capability lists from a role-based access control system. The presence of this means allows the application of role-based access control systems as known from the prior art on security systems of computer systems as installed in the field in a large number. The inventive system allows advantageously the application of role-based access control systems without any modification or even new implementation on the installed security systems. Therefore, role-based access control systems can be provided for existing computer systems with low cost and high security and integrity of the data within the computer system.

In a further embodiment of the invention the system comprises means for deriving and generating user accounts from the capability list. This is advantageous since it allows the automatic derivation and generation of user accounts on all computer systems that host objects occurring on the capability lists of subjects. This requires less efforts, and thus restricts the possibility and probability of errors and confusion and therefore provides a higher system security.

BRIEF DESCRIPTION OF THE DRAWINGS

FIG. 2B shows an example of role type instantiation.

DESCRIPTION OF A PREFERRED EMBODIMENT

An elaborated preferred method for controlling access rights of subjects on objects in a computer system and a preferred embodiment of a system for authorizing and control of access rights according to the present invention will be described with reference to the accompanying drawings.

Figure 1:
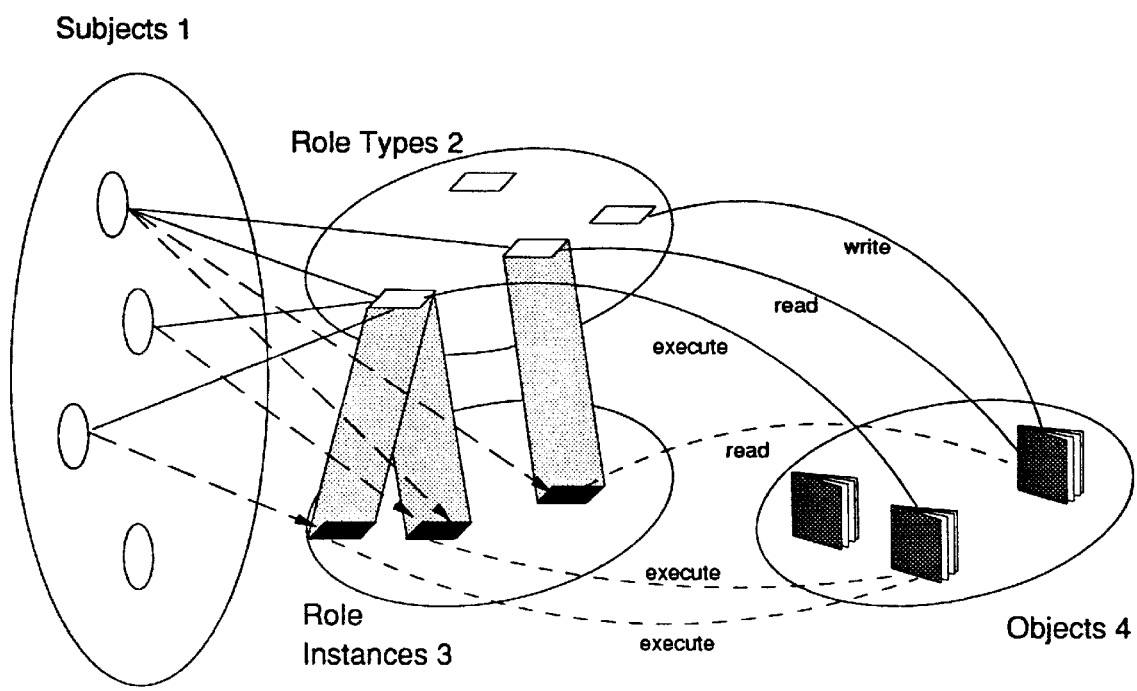
FIG. 1 gives an overview of the method for controlling access rights.

The FIG. 1 gives an overview of the method for controlling access rights. A set of subjects 1 as holders of access rights is defined and associated to a set of role types 2. The role types 2 are instantiated into a set of role instances 3 and therefore the subjects 1 are associated to the role instances 3. Multiple subjects 1 can be associated with one role type 2. Also, a subject 1 can be associated with more than one role type 2. The instantiation of role types 2 into role instances 3 also determines the association between the role instances 3 and the objects 4 of the computer system. Usually there will be multiple instances of one role type due to different parameter values provided by different subjects.

Figure 2A:
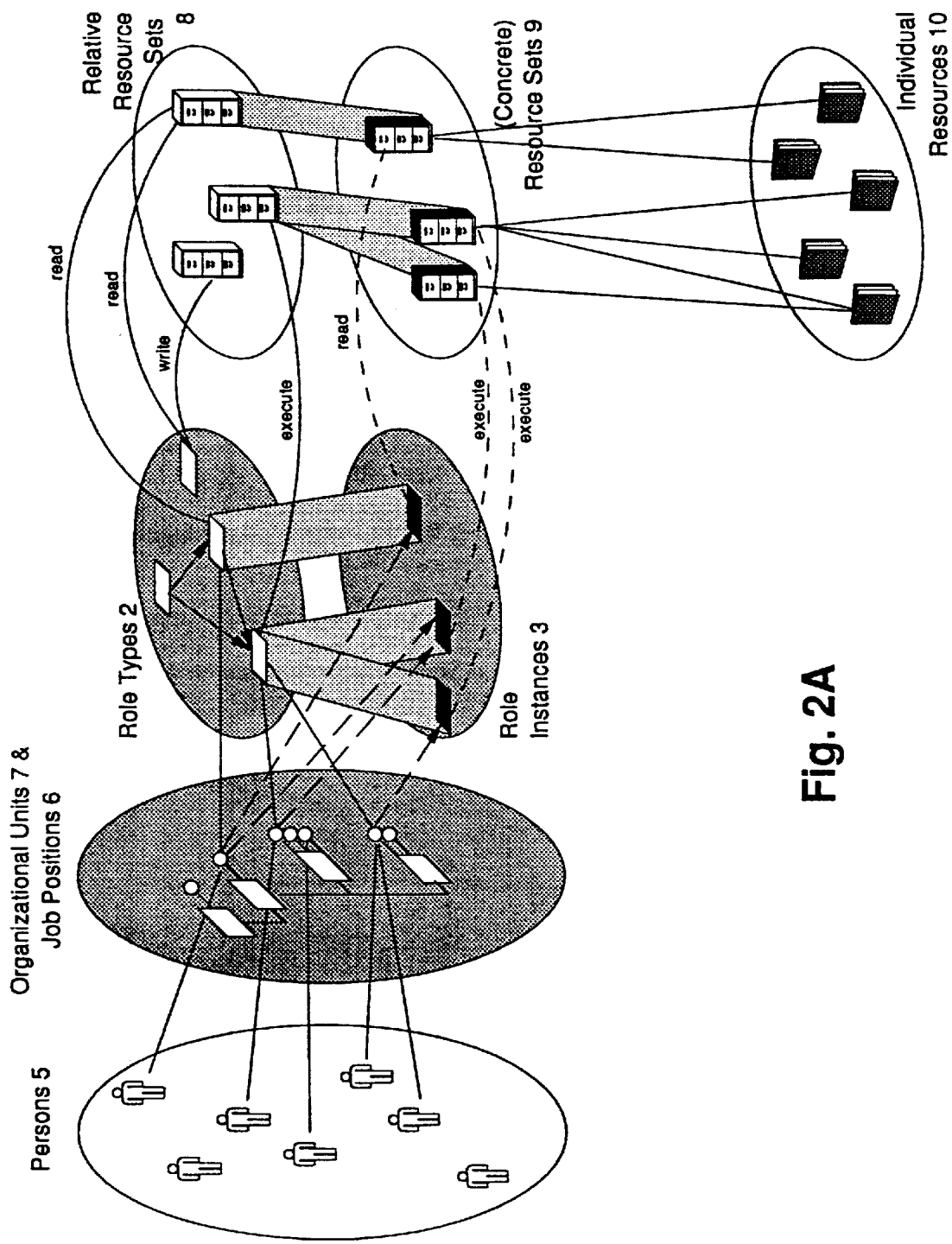
FIG. 2A gives an overview of role type instantiation.

The FIG. 2A gives an overview for the method of role type instantiation. Persons 5 that are users of an enterprise computer system are employees acting in assigned job positions 6. Each job position 6 is associated with a set of functional tasks and, thus, these tasks are associated with users in the enterprise organization hierarchy. Each task requires a set of competencies, which can be viewed as a set of specific access rights to a set of objects 4 necessary to carry out that task. Hence, each job position 6 ultimately associates a user with specific access rights to a set of objects 4. Thus, a security administrator must be able to associate these rights, objects, and transactions with the job positions of the enterprise organization. To enable this, the concepts of role types and role instances are defined.

The FIG. 2B shows job positions 6, role types 2, and the creation of role instances 3. The diagram shows an organization structure, e.g. organization units 7 and job positions 6, on the left and a set of role types 2 on the top of the matrix. An "X" in a field of the matrix means that a role instance 3 of the corresponding role type 2 is assigned to the job position 6. The necessary parameter values to instantiate the role type 2 are derived from attributes of the individual job position 6 or a higher level organization unit. The values of these attributes determine the actual competencies the job position 6 is assigned via the role instance 3. Job positions 6 may share the same role instance 3 as illustrated by the shaded fields in a column.

A job position 6 is associated with one or more role instances 3, depending upon how granular the job position 6 is intended to be. These role instances 3 are derived from different role types 2. For example, there are three role instances associated with the job position "staff member 2" of "private loans", one derived from the role type "loan specialist", another one derived from "customer consultant", and one derived from "bank employee".

Often similar job positions, such as "staff member 1" and "staff member 2" of the "private loans" department, will be assigned to the same role instance as shown from the shaded fields in the matrix, because none of the attributes that are relevant for instantiating the role type differ between the job positions. However, different job positions 6 or similar job positions 6 in different organization units 7 will usually be associated with different role instances 3 of the same role type 2, because they bring in different attribute values for the role type instantiation. In the above example the role type "loan specialist" is instantiated in two different role instances that are bound to two different job positions of the department "object appraisal", the "team-leader" and the "staff member 1" position.

Job sharing can be modelled by assigning one job position 6 to multiple persons 5. On the other hand a single person 5 may be assigned to multiple job positions 6. For example, a person 5 in a "staff member" position in a department may also act, perhaps temporarily, as the "department manager". Of course, assignment to some job positions 6 may exclude assignment to other job positions 6 for separation-of-duty reasons. For example, a person 5 in the job position 6 "security administrator" may not be assigned to the job position 6 of "auditor" because otherwise the accountability of the "security administrator's" actions would be lost.

Figure 2C:
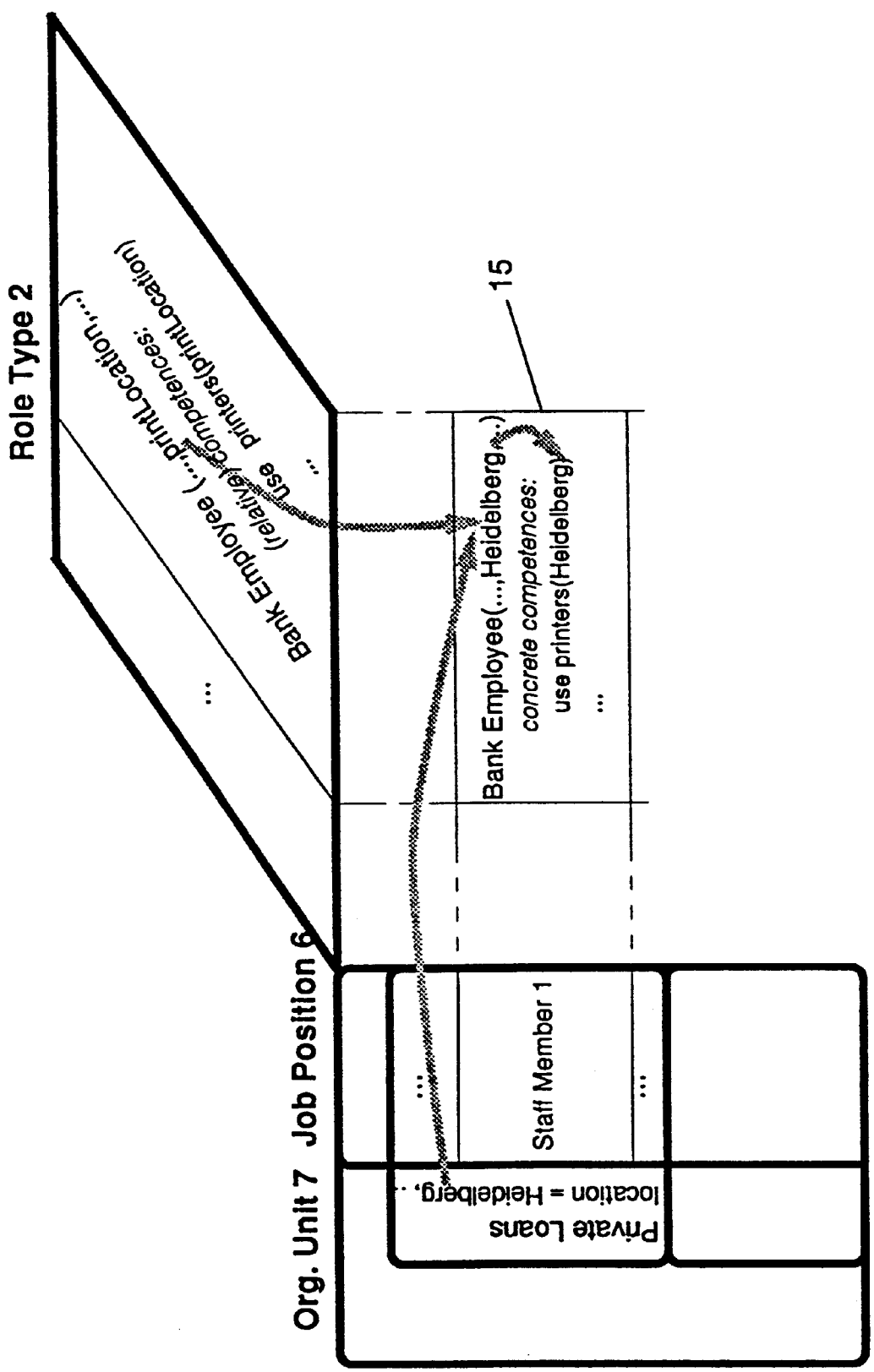
FIG. 2C shows the example of role type instantiation of FIG. 2B in more detail.

The FIG. 2C shows an example of the role type instantiation method in more detail, especially for the role instance in the framed matrix cell 15 of FIG. 2B. A role instance 3 binds the relative competencies defined by a role type 2 to the objects 4, and access rights specific to an organization unit 7 or a job position 6. To perform this, at first for each organization unit and for each job position 6 a set of attributes has to be declared as relevant for role type instantiation. These attributes are said to be advertised. As an example, this could be the department identity or the location attribute of the department organization unit or the project identity attribute of a job position 6. Second, so-called relative resource sets 8 may be defined and associated with role types 2. A relative resource set 8 specifies the parameters it expects for instantiation from among the advertised ones in the enterprise. For example, one could define the relative resource set "printers" (printlocation) by enumerating the printers that are available to each location:

printers (Boeblingen): ={p2160, p2240, ... }
printers (Heidelberg): ={prt01, prt02, ... }

The "print location" parameter is declared as referencing the advertised "location" attribute of a department.

Thus, when a job position 6 as part of certain organization units 7 is combined with a role type 2 associated with parameterized relative resource sets 8, the actual resources can be determined by instantiating the parameters with the values of the advertised attributes for this job position 6. In the example of FIG. 2C, if 1. private loans is located in Heidelberg,
2. the relative resource set 8 "printers (printlocation)" is associated with role type 2 "bank employee" with permission "use", and
3. "staff member 1" of the department "private loans" is assigned the role type 2 "bank employee".

Then "staff member 1" will have "use" access to the printers "prt01, prt02, ... ".

Whether a new role instance 3 has to be created in this case depends on whether the "bank employee" role type 2 has already been instantiated with the same parameters. If this is the case "staff member 1" will only be assigned the already existing role instance 3 "bank employee ( ... , Heidelberg, ... )".

Figure 3A:
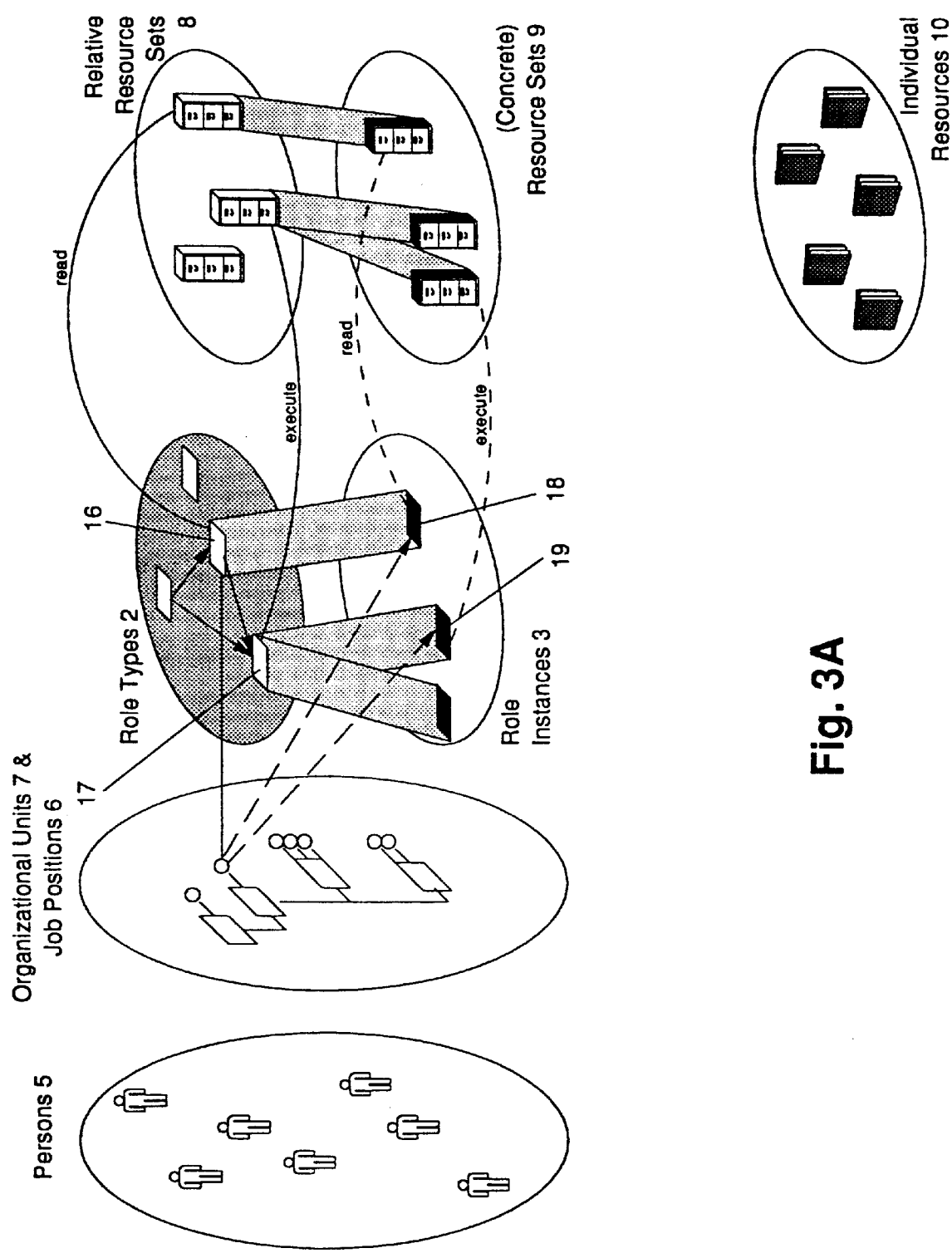
FIG. 3A shows the aspect of role type hierarchy of the inventive method.

FIG. 3A shows the role type hierarchy in the disclosed inventive method. The access-control policy semantics captured by the specification of role types reflect the functional partitioning and inclusion of generic access rights, resources, and transactions necessary to conduct the business activities and management of an enterprise. This partitioning and inclusion is intended to cover the data and application access relationships that are independent of the users job position 6 and organization context, i.e. units 7, of the enterprise. The rest of the access-control semantics captured by role instances 3 and job positions 6 reflect constraints placed by enterprise policies, such as the need-to-know and separation-of-duty policies, on enterprise organization units 7.

A role type 2 is defined as a set of generic parameter-dependent resources and their associated permissions or access rights. In a special case they may also contain concrete resources that do not depend on any parameters. Role types 2 can be organized hierarchically by a "subsumed" relation. If a first role type 16 subsumes a second role type 17 then the set of access rights available to an instance 18 of the first role type 16 includes those available to a corresponding instance 19 of the second role type 17. The expression "corresponding" in this context means that both role types 16, 17 are instantiated with the same parameter values. The subsuming role type 16 must have at least the parameters of the subsumed role type 17, but it may have more.

The role type hierarchy defines in mathematical terms a lattice structure. Trivially, the top of the lattice can include all types of access rights to all objects 4, whereas the bottom can include the respective empty sets. Of course, lattices with non-trivial tops and bottoms can be defined. When instantiating a lattice of role types in a system, the top and bottom of the lattice need not be used for any specific role instance 3 and job position 6.

It is the implicit assumption which leads to the notion of the role type hierarchy that the sets of generic competencies of job functions 6 and the role types 2 derived from them 1. can be structured as hierarchies by the subsumed relation, and
2. do not change very frequently.

The first assumption appears to be realistic because enterprise access control policies are often defined to reflect the hierarchical relationship built in an enterprise organization and functions. The second assumption also appears to be realistic because the job functions defined with an enterprise are stable since they are based on the enterprise business characteristics. Since the definition of job functions does not change very often, the sets of access rights to objects 4 needed for a job position 6 are not expected to change very often. It is important, that neither assumption prevents the addition of new role types 2 to the lattice nor that of new role instances 3 and job positions 6 to an enterprise.

Figure 3B:
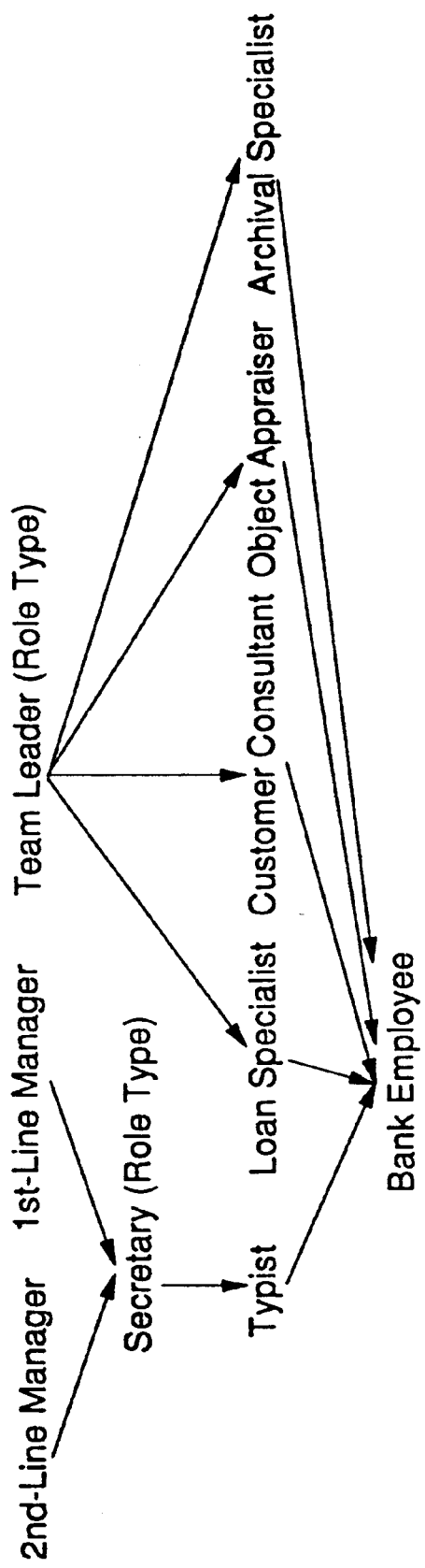
FIG. 3B shows an example of role type hierarchy for the business field of banking.

The FIG. 3B shows an example for the role type hierarchy within the inventive method of access control. The example shows a hierarchy of the role types 2 used in FIG. 2B. In this example the access rights of a "second-line manager" and of a "first-line manager" subsume those of a "secretary" which in turn subsume those of a "typist". All role types subsume the role type "bank employee". As a consequence "bank employee" could be dropped from the matrix in FIG. 2B because the corresponding competencies are covered by a membership in any of the other role types. For the same reason the "team-leader" of the "object appraisal" department does not have to be assigned the "loan specialist" role explicitly since his "team-leader" role type subsumes it.

Figure 4:
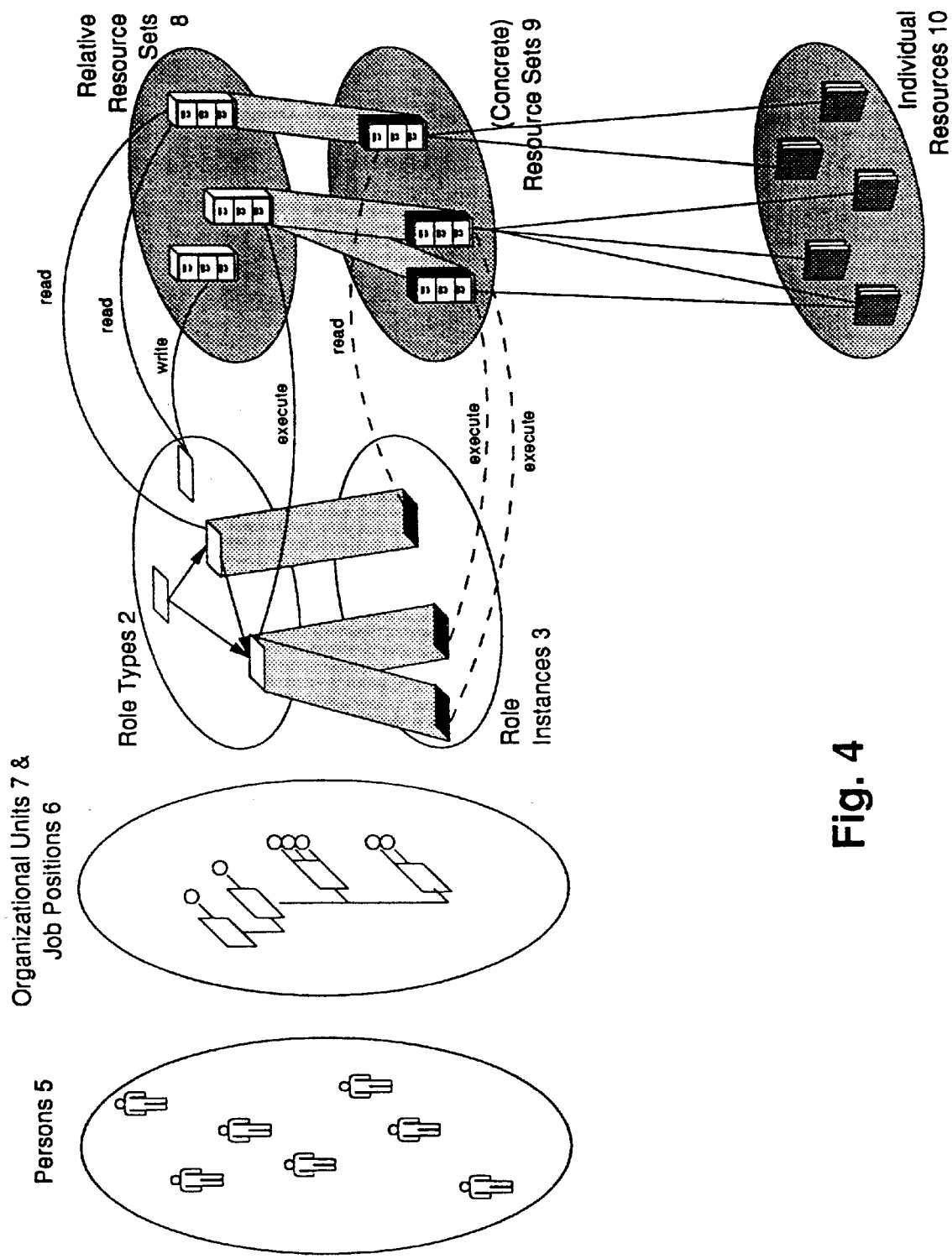
FIG. 4 shows a method of resource set definition.

The FIG. 4 shows the instantiation of concrete resource sets 9 and individual resources 10 from parameterized relative resource sets 8. The parameterized relative resource sets 8 are associated to the parameterized role types 2. The concrete resource sets 9 are derived from the parameterized relative resource sets 8 by using the parameter values provided from the subjects 6, 7 in the computer systems, e.g. provided from the job positions 6 and organization units 7 of the enterprise. The individual resources 10 are grouped to concrete resource sets 9. For example one possible parameterized relative resource set 8 is the resource set of "printers" with a parameter "printlocation". By providing the location parameter, for example location Heidelberg, the relative resource set 8 is instantiated into the concrete resource set 9 that includes all printers at the location Heidelberg. These printers at the location Heidelberg represent the individual resources 10.

Figure 5:
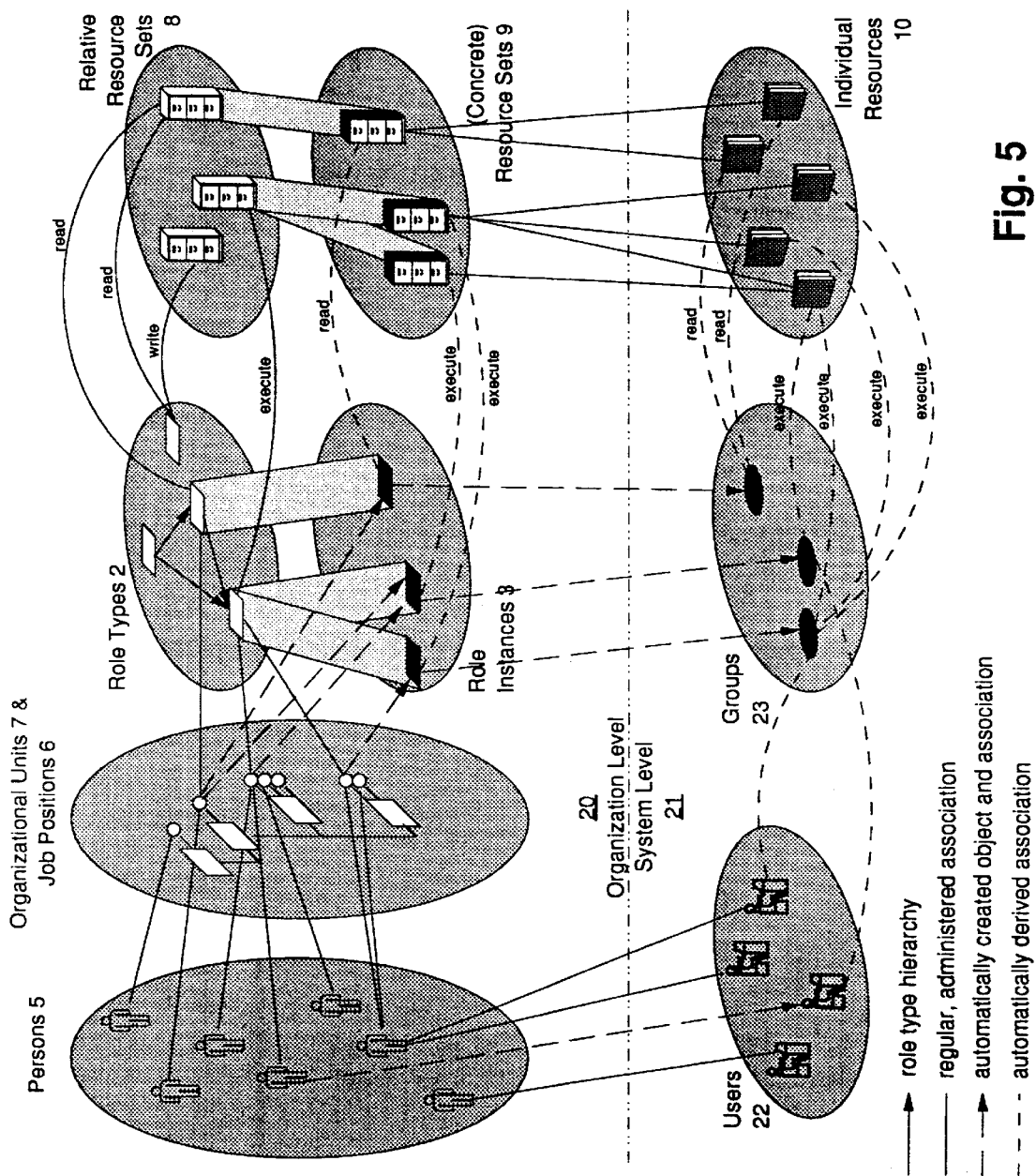
FIG. 5 gives an overview of the method for controlling access rights on organizational level as on system level.

The FIG. 5 shows an overview of the method for controlling access rights for the organizational level 20 as well as for the system level 21. It is shown that on the system level 21 persons 5 are represented as users 22, wherein one person 5 may have multiple user identifications, which may be derived from the role information and automatically generated (automatic registration) in the same way as the access rights are derived (automatic authorization). Furthermore, it is shown that the role instances 3 on the organization level 20 are represented by groups 23 on the system level. Furthermore, the concrete resource sets 9 are represented by the individual resources 10 on the system level 21.

Figure 6:
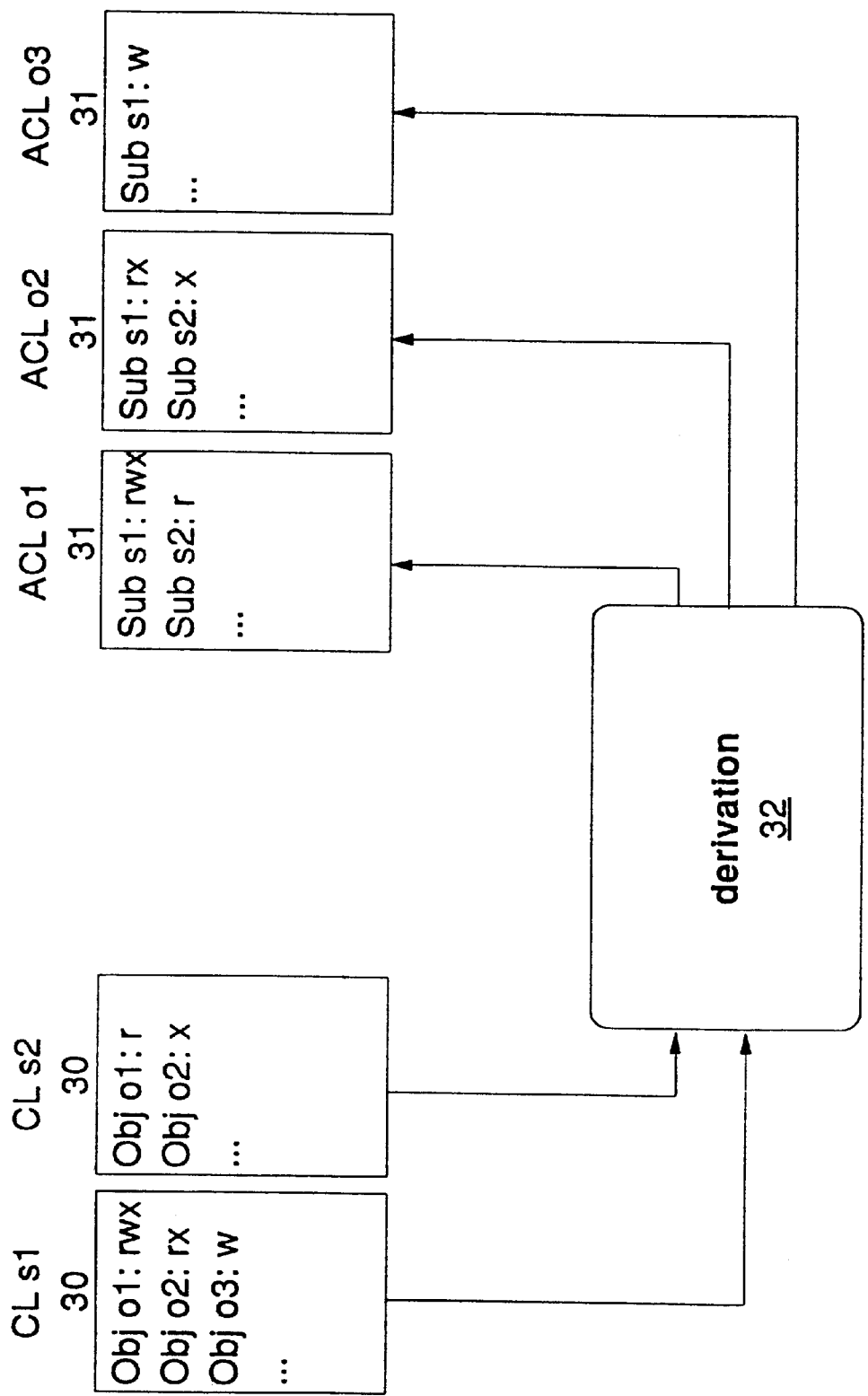
FIG. 6 gives an overview of the system for authorization and control of access rights.

The FIG. 6 shows a preferred embodiment of a system for authorization and control of access rights as disclosed in the present invention. It is shown that capability lists 30 associated to the subjects 1 of the computer system and containing the access rights of the respective subject 1 on the objects 4 of the computer system can be derived by appropriate derivation means 32 into access control lists 31 associated to the objects 4 of the computer system and containing the access rights of the subjects 1 of the computer system on the respective object 4. The derivation means 32 can be implemented by hardware or by software. Furthermore, it is also possible to derive capability lists 30 from existing access control lists 31.

Figure 7:
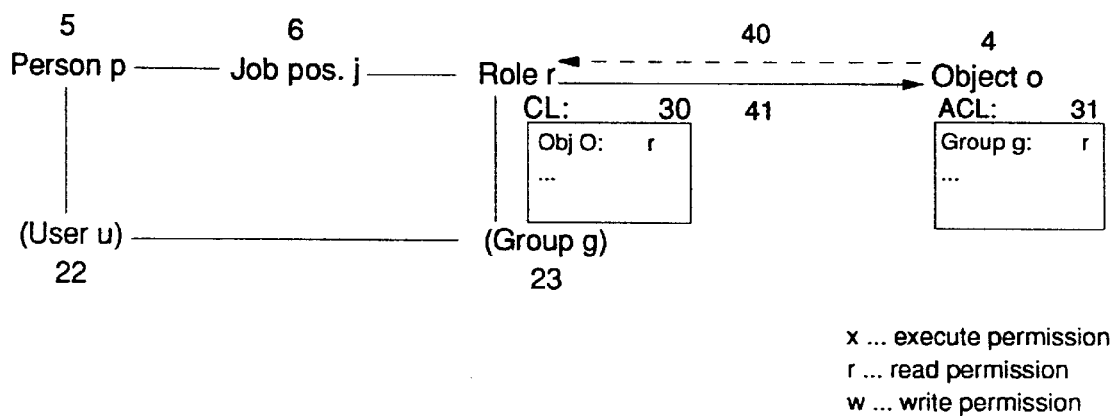
FIG. 7 shows the possibility of a per-object-review as well as a per-subject-review as provided by the inventive system.

The FIG. 7 shows the possibility to perform a per-object review 40 with the inventive system for authorization and control of access rights. In this example the access rights may be an execute permission "X", a read permission "R" or a write permission "W". Since the inventive control system provides access control lists 31 associated with the objects 4 of the computer system it is possible to evaluate these access control lists 31 in order to determine all access rights of groups 23 within the computer system on the respective object 4. The group 23 is the representation of an instance, i.e. a role instance 3, of a parameterized role type 2. The role type 2 is instantiated by at least one parameter value provided by the job position 6. The person 5 assigned to this job position 6 has at least one user identification.

As also shown in FIG. 7, the inventive system for authorization and control of access rights as disclosed in the present invention offers the possibility to perform a per-subject review 41. The job position 6 to which a person 5 is assigned to is associated with a role. Associated to this role are the access rights of that role on the objects 4 of the computer system. The inventive system comprises capability lists 30 containing these access rights for each role. Furthermore, the system comprises deriving means 32 to generate new or modify existing access control lists 31 from the capability lists 30.

What is claimed is:

1. A method for controlling access rights of at least one subject on at least one object in a computer system, wherein said subject is associated to at least one role, said method comprising the steps of:

controlling said access rights dependent on a membership of said subject to said role, controlling said access rights dependent on a parameterized role type, controlling said access rights dependent on at least one parameterized relative resource set, representing said role by instantiating role instance by deriving said role instance from said role type, said step of instantiating said role instance being based on providing a parameter value to said role type, said parameter value further characterizing said subject, instantiating a concrete resource set by deriving said concrete resource set from said relative resource set, said step of instantiating said concrete resource set being based on providing said parameter value to said relative resource set, and providing said object as an element of said concrete resource sets.

2. The method according to claim 1, further comprising the step of:

providing said parameter value by said subject.

3. The method according to claim 2, wherein a job position within an organization unit of the organization of said subject is provided, said method further comprising the step of:

providing said parameter value by said job position or by said organization unit.

4. The method of claim 3, further comprising the step of:

combining said job position with at least one of said role types.

5. The method of claim 1, further comprising the step of:

associating at least one of said parameterized relative resource sets with said role types.

6. The method of claim 5, further comprising the step of:

performing a configuring step for deriving said role instances and for deriving said concrete resource sets and objects.

7. The method of claim 1, further comprising the steps of:

specifying capability list types associated with said role types; and, performing a configuring step for deriving a capability list associated with a corresponding role instance from said capability list types, said capability list providing said access rights of said role instance on said objects.

8. The method of claim 7, further comprising the step of:

modifying access control lists associated with said concrete resource sets and objects, said access control lists provide said access rights of said subjects on said object.

9. The method of claim 1, wherein said role types are organized hierarchically.

10. A computer system for registration, authorization, and control of access rights of at least one subject on at least one object, said system comprising:

at least one parameterized relative resource set, and a concrete resource set, instantiated and derived from said relative resource set, and said object being an element of said concrete resource set, and a parameterized role type for controlling said access rights, and a role instance derived by instantiation from said role type and providing said subject a parameter, and a capability list derived by instantiation from a capability list type, said capability list being associated with said role instance and with said subject and providing said access rights of said subject on said object, and an access control list for said object providing said access rights of subjects on said object, and means for deriving said access control lists of said objects from capability lists associated with subjects, and means for deriving said access control lists during a configuring step of said system.

11. The system according to claim 10, further comprising means for deriving and generating necessary user accounts from locations of objects in said capability lists.

* * * * *